M. L. NORTHRUP.
STORAGE SYSTEM FOR SEED CORN.
APPLICATION FILED OCT. 24, 1910.
991,351.
Patented May 2, 1911.
3 SHEETS—SHEET 1.
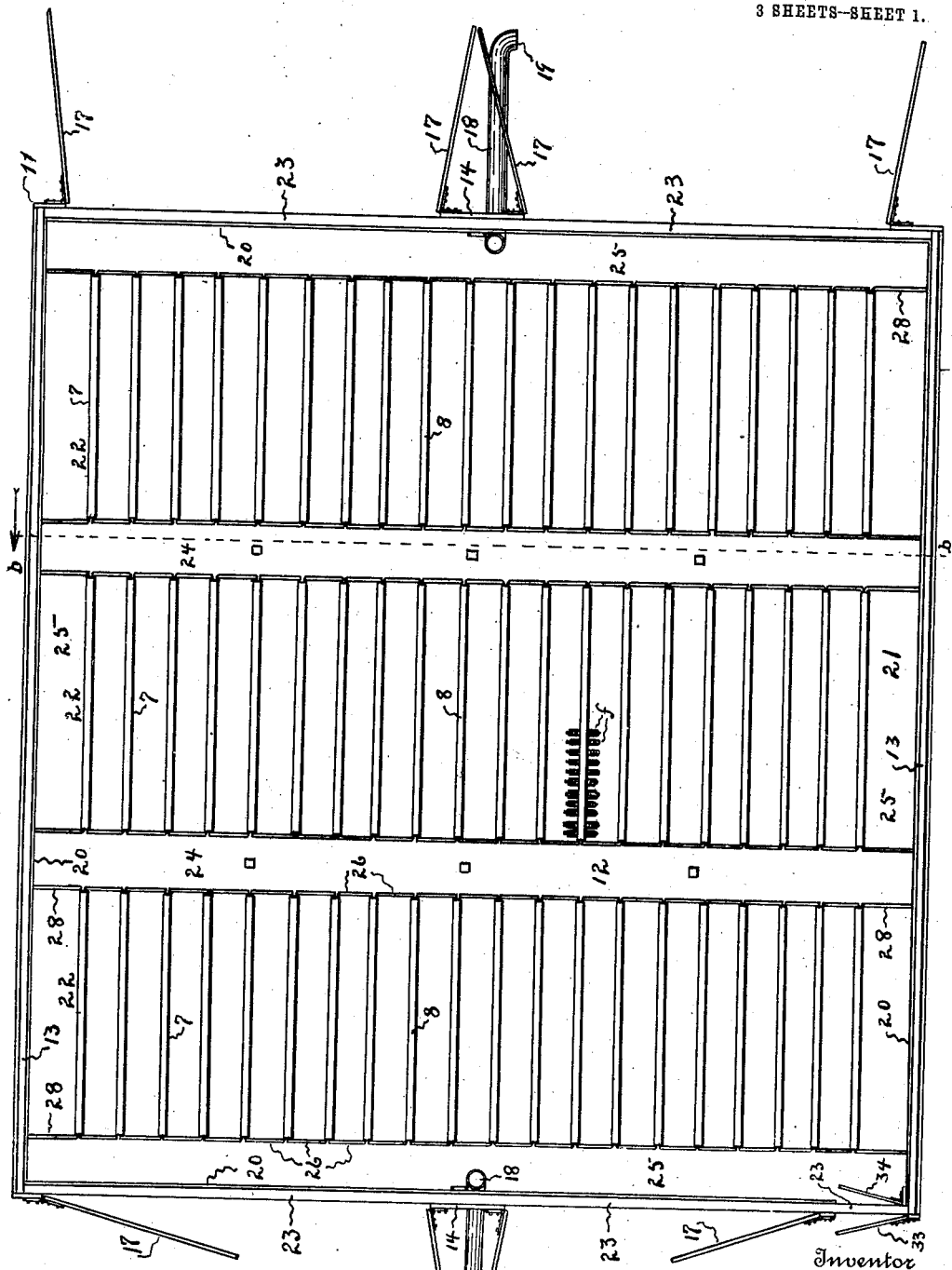

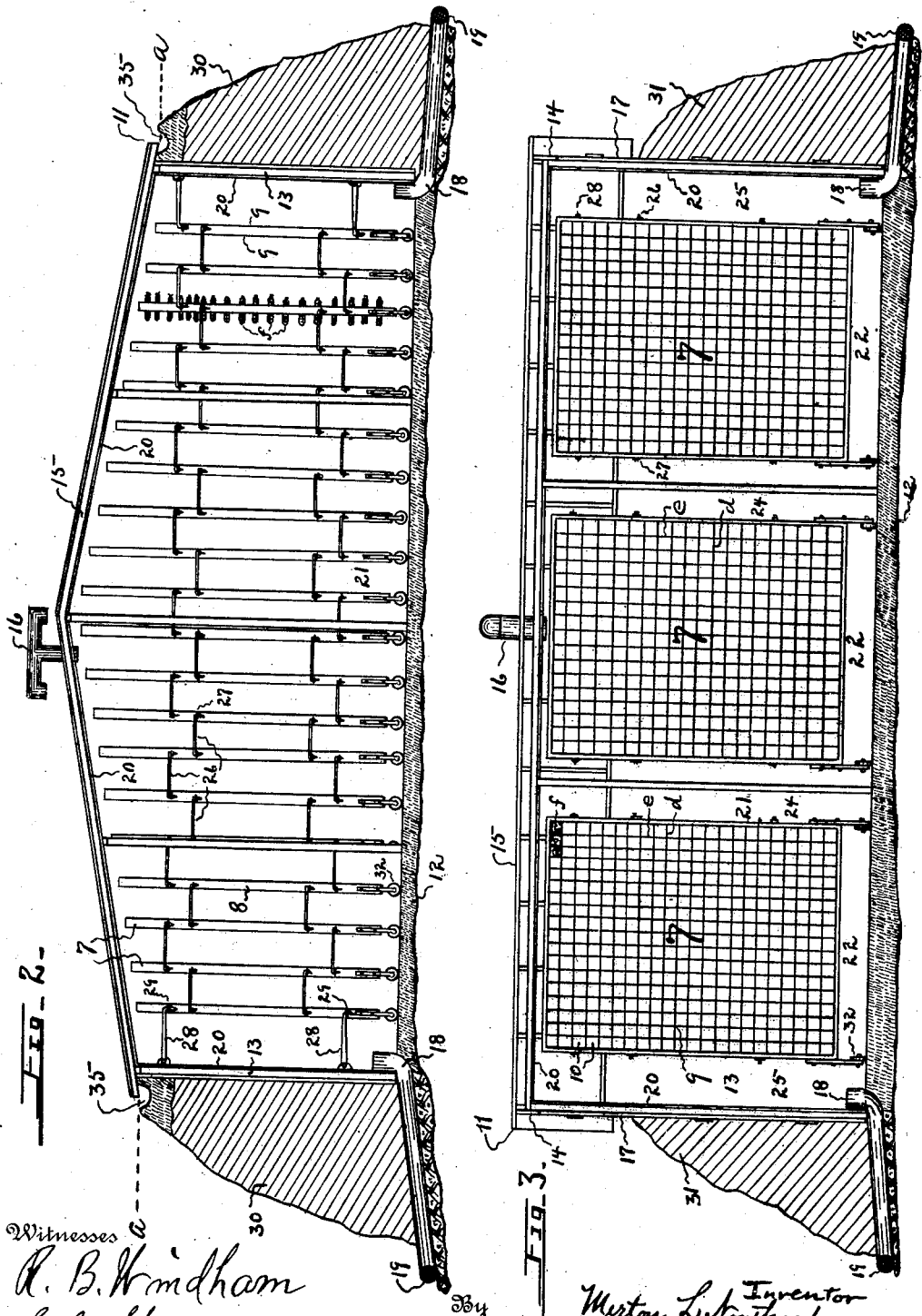

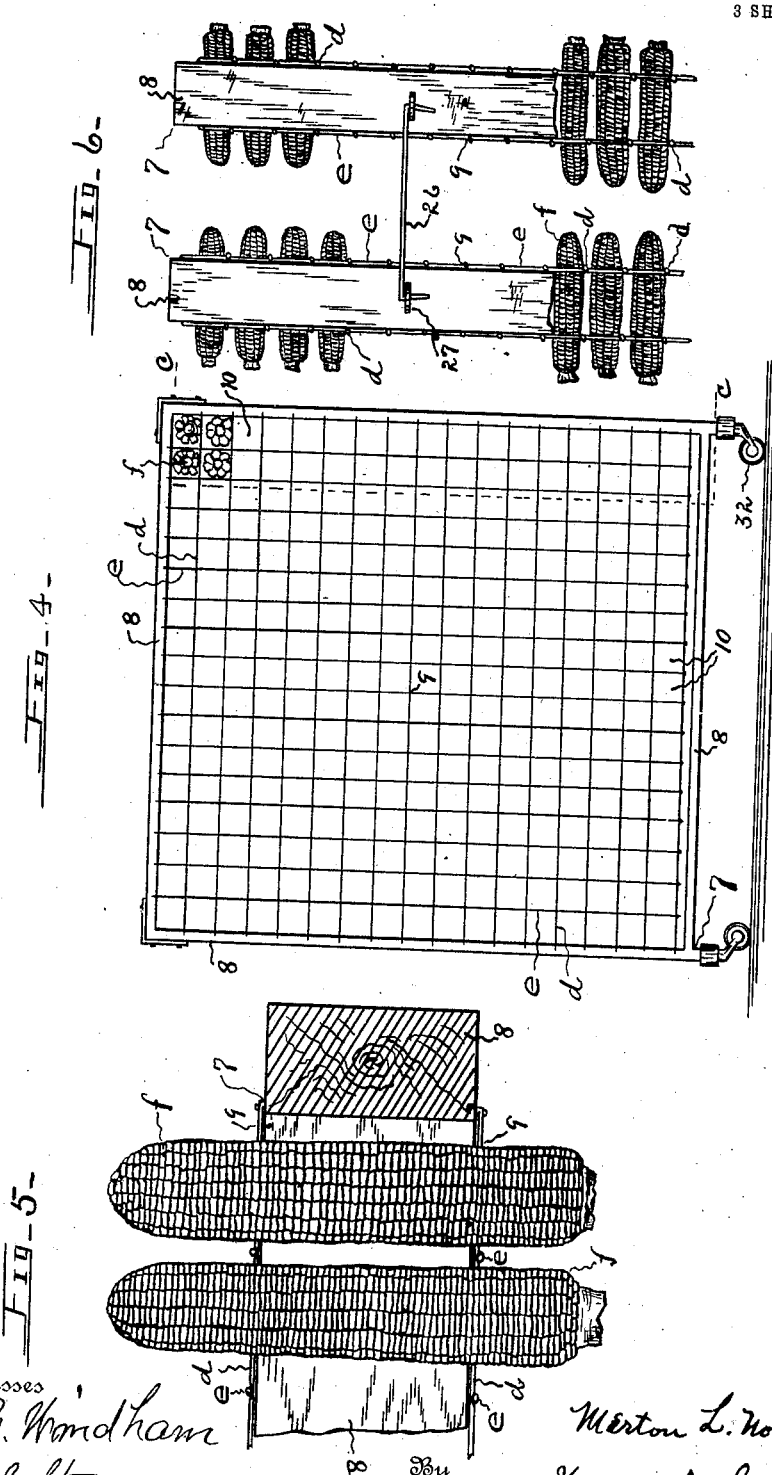

UNITED STATES PATENT OFFICE.

MERTON L. NORTHRUP, OF LEWIS, IOWA.

STORAGE SYSTEM FOR SEED-CORN.

991,351.   Specification of Letters Patent.   Patented May 2, 1911.

Application filed October 24, 1910. Serial No. 588,580.

*To all whom it may concern:*

Be it known that I, MERTON L. NORTHRUP, a citizen of the United States, residing at Lewis, in the county of Cass and State of Iowa, have invented certain new and useful Improvements in Storage Systems for Seed-Corn, of which the following is a specification.

This invention relates to an improved storage system for seed corn, and has for its object, broadly, to provide a system whereby corn, while in the ear, may be conveniently handled and stored during the "curing" period or the time required for the evaporation of all moisture from the seed and cob, and whereby the corn may be suitably exposed to air drafts or ventilation to prevent heating or molding, may be protected from freezing and will be disposed convenient for inspection.

The invention has reference to the employment of racks for holding the corn, so that each ear will be separately supported in a manner to prevent heating or molding, while housed from the weather, the object being to store, economically, as great a quantity of corn within a given space as will be consistent with thorough and uniform ventilation during the period required for drying the seed, and for protecting the same until it is required for use, any or all of the ears being convenient for inspection, whenever desired.

With these and other objects in view, the invention consists of the novel construction, combination and arrangement of parts as described herein and claimed, and as illustrated in the drawing, it being understood that changes in form, size, proportion and minor details may be made within the scope of the claims without departing from the spirit of the invention or sacrificing any of its advantages.

In the accompanying drawing, Figure 1 is a plan view of my system, being a sectional view on line $a$ $a$ of Fig. 2, this section being taken immediately below the roof of the building, the embankments being omitted. Fig. 2 is an end view of the housing element or building, showing embankments and corn racks, being a transverse section on line $b$ $b$ of Fig. 1. Fig. 3 is a longitudinal sectional view of the building, and a side view of the corn racks. Fig. 4 is a side view of one of the corn racks. Fig. 5 is an enlarged detail, being a plan view of parts sectioned on the irregular line $c$ $c$ of Fig. 4. Fig. 6 shows a broken away end portion of two of the corn racks connected by a removable keeper or yoke.

It has been found to be advisable, when the ears of seed corn have fully matured, to gather them while the stalks are still standing in the field and before they have been affected by the frost. The ears, when gathered, are therefore damp, and they will become heated and moldy unless separated and exposed to the air until thoroughly dry. Also they must be protected from freezing during the winter months; and it is desirable to have convenient access to the corn for examination during the period required for drying.

For the purpose of disposing the corn so that it may be properly stored, protected, ventilated and may be conveniently examined and handled, I provide a plurality of movable racks 7, each preferably consisting of a rectangular, upright frame 8, upon the opposite sides of which may be mounted a web or grid 9, each preferably consisting of a plurality of parallel, adjacent ear-supporting rods or strands $d$ and a plurality of transverse, adjacent dividing rods or strands $e$. Grids or webs 9 may be economically formed or manufactured since they are substantially the same in structure as ordinary wire netting. Frames 8 may be constructed to advantage of wood and I have used 2x4 scantling for this purpose, the netting being secured upon the sides of the frame for the support of the corn, but I do not limit myself to the kind of material to be employed. The frames have a depth or thickness somewhat less than the length of the ears of corn to be supported, and since the grids or sheets of wire netting are mounted side-by-side, the interstices or meshes 10 thereof, horizontally considered, being opposite to each other and of ample size to contain an ear of corn, each of the ears $f$ will have two supports between its ends as clearly shown in Figs. 5 and 6; the ears will be separated by the dividing rods or strands $e$, and may be removed, examined and replaced conveniently.

While I have shown horizontal supporting-strands and vertical dividing strands mounted upon an upright frame for the support of the ears, I do not limit myself in this respect, and the strands may have any desired degree of inclination while supported by the frame.

In order that the corn in the racks may be protected, I provide any suitable housing, as building 11, provided, preferably, with a cement floor 12, upright side walls 13, end-walls 14, and an inclined roof 15 having an air exit-way or ventilating pipe 16, the end walls being provided with wide, outwardly swinging doors 17; and air-intakes or inclined ventilating pipes 18 are provided, the same passing through the lower part of the walls and having netting or grates 19 mounted to cover their outer terminals to prevent ingress of rats or mice, and for the same purpose a suitable lining 20 is provided and mounted upon the inner side of the end and side walls of the building and upon the inner side of the roof, to the end that rodents or similar animals will be effectually excluded from the single chamber or room 21 of the building which may contain the seed corn.

In order that the air may circulate freely between the racks, they are arranged in parallel sections 22, the racks of the sections preferably being disposed end-to-end and in alinement to provide uninterrupted air passageways extending between openings 23, said openings being formed in the ends of the building; and, as will be seen by reference to Fig. 1, openings 23 extend, substantially, the entire width of the building to permit a free and uniform circulation of air. The racks and sections are arranged within chamber 21 in a manner to provide passageways 24 between sections 22, and a passageway 25 extending entirely around the sections, the object being, in part, to dispose the corn at some distance from the walls, and to provide convenient access to the racks so that a person may inspect any part or all of the seed corn. The racks may have heights of varying extent, so that all of the space, substantially, from the floor to a point near the roof may be utilized for storage of corn. In order that the racks may be disposed at a uniform distance apart and may be sustained in an upright position, yokes 26 may be used and mounted transversely upon the ends of the rack-frames in staples 27, all of the rack-frames of a section being connected, the sections being supported by upper and lower hook-rods 28 mounted upon the side walls of the building and engaging staples 29 upon the ends of the terminal racks of each section.

As thus described all of the floor space within chamber 21 is utilized by the racks and passageways. In practice, each of the spaces 10 formed by the wire netting may support a seed corn ear, and after the racks have been filled, all of the doors at the ends of the building may remain open until the corn becomes dry and hardened.

Any suitable measures may be practiced in cold weather to prevent freezing of the corn, permanent embankments 30, preferably, being provided at the sides of the building. When freezing weather commences, the doors being then closed, any suitable temporary embankments 31 may be formed or provided to cover or partly cover the doors and ends of the building to prevent freezing, ventilating pipes 18 having a length sufficient to extend outwardly of the embankments.

It will be understood that the racks may be moved while in an upright position, the frames being provided with wheels or casters 32 for this purpose. They may be disposed at any suitable distance apart to allow a free circulation of air therebetween while the corn is attaining a dry or hardened condition.

By removing yokes 26 the racks may be moved or packed together at the middle of the building, when desired, and for the purpose of placing the corn in the racks, they may be moved singly and conveniently into the positions shown in the drawing.

At 33 is shown a small side door and a corresponding screen door 34 for access to chamber 21, for it is desirable that the screen lining 20 may cover the entire interior walls of chamber 21 independently of doors 17, these doors being used only for purposes of ventilation and for sustaining the temporary embankments.

As thus described a very convenient system is shown for the necessary storage, protection, handling, inspection and care of each ear of corn, and the system presents economical features, since a large quantity of corn may be contained within a limited space.

In cases where embankments 30 at the sides of the building are permanently built, it is advisable to provide cement gutters 35, near the eaves, as shown in Fig. 2. Embankments 31 are temporary, and may be removed each season.

Having fully described my invention, a further explanation relating to operation is not necessary.

What I claim as new and desire to secure by Letters Patent is—

1. A system for storage of seed corn, comprising, in combination with a rectangular building having hook-rods mounted upon its side walls and formed with openings in its end walls; a plurality of racks each comprising a rectangular, elongated frame having staples mounted upon its ends, and provided upon its open sides with crossed wires to form compartments therein, said frames disposed side-by-side to form sections; a plurality of yokes disposed at the ends of the racks of each section and engaging the staples thereon for maintaining said frames parallel, said hook-rods engaging the racks at the ends of the sections for maintaining said racks in an upright position and in alinement with the openings of said end walls.

2. A system for storage of seed corn, comprising, in combination with a rectangular building having detent-rods mounted upon its side walls and formed with openings in its end walls; a plurality of racks, each consisting of a bottom strip provided with roller-members, end strips provided with staples and a top strip, said strips being disposed in a single plane to provide a rectangular frame with wires disposed at right angles and mounted upon the sides thereof to form compartments therein; said racks disposed side-by-side to form sections; a plurality of yokes disposed at the ends of the racks of each section and engaging the staples thereon for maintaining said racks parallel, said detent-rods engaging the racks at the ends of the sections for maintaining said racks in an upright position and in alinement with the openings of said end walls.

3. A system for storage of seed corn, comprising, in combination with a rectangular building having openings in its end walls; a plurality of narrow, rectangular frames provided on their sides with grids, the openings thereof providing oppositely-disposed compartments for containing the ears of corn, the end of each frame at its lower terminal being provided with a single supporting-roller; said frames disposed side-by-side to form sections; means disposed between and in engagement with the frames of the sections for maintaining said frames substantially parallel; and devices mounted upon the side walls of the building and connected with the ends of the sections for maintaining the frames in substantially a vertical position, in alinement with the openings of said end walls.

In testimony whereof I have affixed my signature in presence of two witnesses.

MERTON L. NORTHRUP.

Witnesses:
B. C. HARRIS,
F. J. MACOMBER.

Copies of this patent may be obtained for five cents each, by addressing the "Commissioner of Patents, Washington, D. C."